US010492250B2

(12) United States Patent
Volpato (10) Patent No.: US 10,492,250 B2
(45) Date of Patent: Nov. 26, 2019

(54) LIGHTING SYSTEM, AND RELATED LIGHTING MODULE

(71) Applicant: OSRAM GmbH, Munich (DE)

(72) Inventor: Luca Volpato, Preganziol (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/109,807

(22) Filed: Aug. 23, 2018

(65) Prior Publication Data
US 2019/0069356 A1 Feb. 28, 2019

(30) Foreign Application Priority Data
Aug. 23, 2017 (IT) .......................... 102017000095581

(51) Int. Cl.
*H05B 33/08* (2006.01)
(52) U.S. Cl.
CPC ..... *H05B 33/0809* (2013.01); *H05B 33/0827* (2013.01); *H05B 33/0845* (2013.01)
(58) Field of Classification Search
CPC ............ H05B 33/0809; H05B 33/0815; H05B 33/086; H05B 33/0821; H05B 33/0845
See application file for complete search history.

(56) References Cited

U.S. PATENT DOCUMENTS

| | | | | |
|---|---|---|---|---|
| 2009/0167398 A1* | 7/2009 | Oishi | ................. | H05B 33/0815 327/261 |
| 2010/0301764 A1* | 12/2010 | Liu | .................... | H05B 33/0818 315/250 |
| 2012/0112660 A1* | 5/2012 | Tseng | ................. | H05B 33/0815 315/294 |
| 2013/0002157 A1* | 1/2013 | van de Ven | ........ | H05B 33/0824 315/192 |
| 2014/0203718 A1* | 7/2014 | Yoon | .................... | H05B 33/083 315/192 |

FOREIGN PATENT DOCUMENTS

| | | |
|---|---|---|
| EP | 2760254 A1 | 7/2014 |
| GB | 2543108 A | 4/2017 |
| WO | WO-2015193071 A1 * 12/2015 | ......... H05B 33/0824 |

OTHER PUBLICATIONS

Italian Search Report based on application No. 102017000095581 (7 pages) dated Apr. 18, 2018 (for reference purpose only).

* cited by examiner

*Primary Examiner* — Raymond R Chai
(74) *Attorney, Agent, or Firm* — Viering, Jentschura & Partner MBB (57) ABSTRACT

A lighting system may have a power-supply circuit and at least two strings of solid-state light sources. The power-supply circuit comprises two output terminals where the power-supply circuit supplies a regulated voltage ($V_{out}$), and where the regulated voltage ($V_{out}$) is periodically activated for a first duration and de-activated for a second duration as a function of a dimming signal. A first string of light sources and a first current regulator are connected in series between the two output terminals, wherein the first current regulator is configured for regulating the current flowing through the first string. A second string of solid-state light sources and a second current regulator are connected in series between the two output terminals, wherein the second current regulator is configured for regulating the current flowing through said second string.

9 Claims, 8 Drawing Sheets

LIGHTING SYSTEM, AND RELATED LIGHTING MODULE

CROSS REFERENCE TO RELATED APPLICATION

This present application claims priority to Italian Patent Application No. 102017000095581 filed on Aug 23, 2017; which is incorporated by reference herein in its entirety and for all purposes.

FIELD OF THE INVENTION

The present disclosure relates to lighting systems.

DESCRIPTION OF THE RELEVANT ART

The correlated colour temperature (CCT) of an incandescent lamp decreases when the light emitted by the lamp is attenuated to implement the so-called dimming function.

This behaviour derives from the fact that partial cooling of the filament of the lamp that emits the light appears to the user as a warmer light at low light intensities, thus creating a light effect similar to that of a candle.

However, this behaviour is not typically obtained with solid-state light sources, in particular LEDs (Light-Emitting Diodes), since the correlated colour temperature remains substantially constant during a dimming operation. However, many users perceive this behaviour as undesirable.

In particular, a lighting system with solid-state light sources typically comprises a power-supply circuit (the so-called Power-Supply Unit, PSU) 10 and at least one lighting module (the so-called Light Engine Module, LEM) 20. For example, the power-supply circuit 10 may comprise a switching power supply/AC-DC or DC-DC electronic converter, which receives at input a power-supply signal (for example, from the power mains supply or a battery) and supplies at output a regulated voltage $V_{out}$ or a regulated current $i_{out}$. The lighting module 20 comprises one or more light sources, including, for example, at least one LED or other solid-state lighting systems, such as laser diodes.

Figure 1:
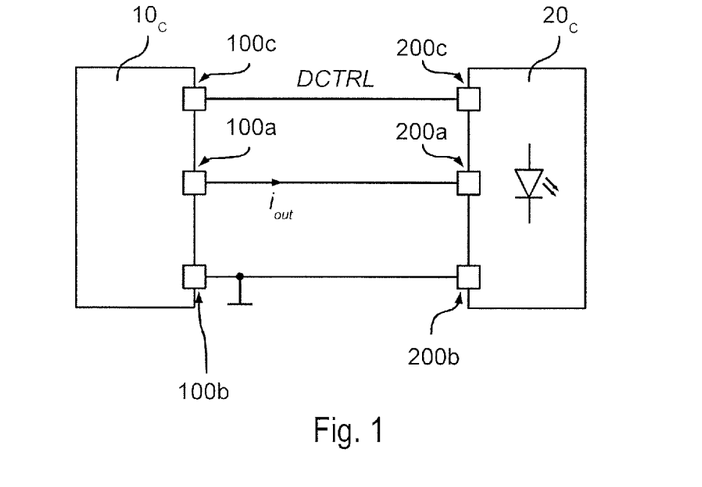

For example, FIG. 1 shows a lighting system, in which the power-supply circuit 10 is a current generator 10c; i.e., the electronic converter 10c supplies at output via a positive terminal 100a and a negative terminal 100b, which represents a voltage reference, a regulated current $i_{out}$.

Figure 2:
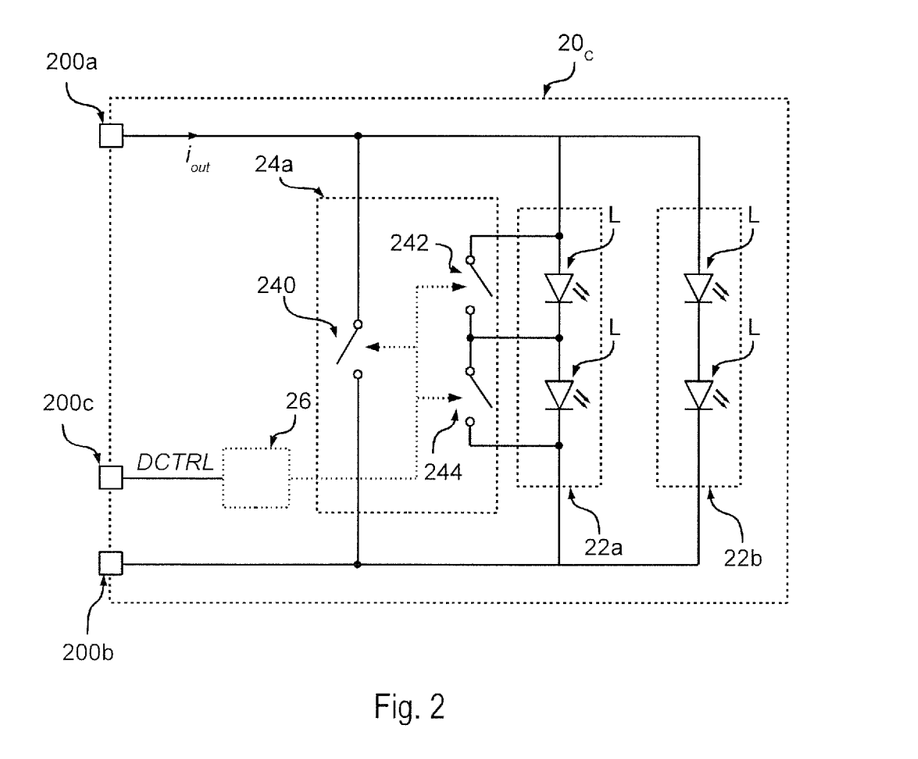

The lighting module 20 is hence a module 20c configured for being supplied by means of a regulated current $i_{out}$. For instance, FIG. 2 shows an example of a lighting module 20c. In particular, the lighting module 20c comprises a positive input terminal 200a and a negative input terminal 200b for connection to the terminals 100a and 100b of the electronic converter 10c. For example, the lighting module 20c may be connected either directly or through a cable to the electronic converter 10c. Consequently, the terminal 200a is connected to the terminal 100a, and the terminal 200b is connected to the terminal 100b, and the lighting module 20 hence receives the current $i_{out}$.

For example, the lighting module 20c may comprise a LED chain or string 22a, in which a plurality of LEDs L (or other solid-state light sources) are connected in series between the terminals 200a and 200b. In general, the lighting module 20c may also comprise one or more further LED strings 22b connected in parallel to the LED string 22a.

In general, the brightness of the sources L (i.e., the intensity of the light emitted by the sources L) can be controlled by regulating the mean current flowing through the sources L. For example, the power-supply circuit 10 can control the brightness of the sources L by regulating the amplitude of the current $i_{out}$, and/or activate and de-activate the current $i_{out}$, respectively, with an ON time $T_{ON}$ and an OFF time $T_{OFF}$, for example by means of a pulse-width modulation (PWM), in which the switching period $T_{SW}=T_{ON}+T_{OFF}$ is constant.

As an alternative or in addition, the lighting module 20c may comprise means 24 configured for controlling the current flow through the LEDs L, which enables regulation of the brightness of the light emitted by the LEDs L. For example, in FIG. 2, the aforesaid means 24 are implemented with one or more electronic switches 240, 242, and 244. For instance, the switch 240 can be connected (for example, directly) between the terminals 200a and 200b and hence enables shorting of all the LEDs L of the lighting module 20c, thus controlling the overall brightness of the lighting module 20c. A similar switch could then be provided within the power-supply circuit 10 for activating and de-activating the current $i_{out}$. Instead, the switches 242 and 244 can be connected in parallel to the respective LEDs L and thus enable shorting of a respective LED L, in this way controlling the brightness of the respective LEDs individually.

In the example considered, the lighting module 20c may then comprise one or more further terminals 200c for receiving one or more dimming-control signals DCTRL. In the simplest case, the signal received can be used for directly driving the means 24. For example, a PWM signal could be used for directly driving one of the switches 240, 242, or 244. In general, the lighting module 20c may also comprise a control circuit 26, which receives the dimming-control signal DCTRL and generates the signals for the means 24, for example, the switches 240, 242, and 244, as a function of the dimming-control signal DCTRL.

Hence, in general, the dimming-control signal DCTRL may be any analog or digital signal that is able to transmit data that identify the brightness required of the lighting module 20c and/or of the LED strings 22a/22b and/or of the individual LEDs L of the lighting module 20c. For example, in various embodiments, the dimming-control signal DCTRL is in compliance with the protocol Digital Addressable Lighting Interface (DALI). For instance, in FIG. 1, the electronic converter 10c comprises a terminal 100c that supplies the dimming-control signal or signals DCTRL for the lighting module 20c.

Figure 3:
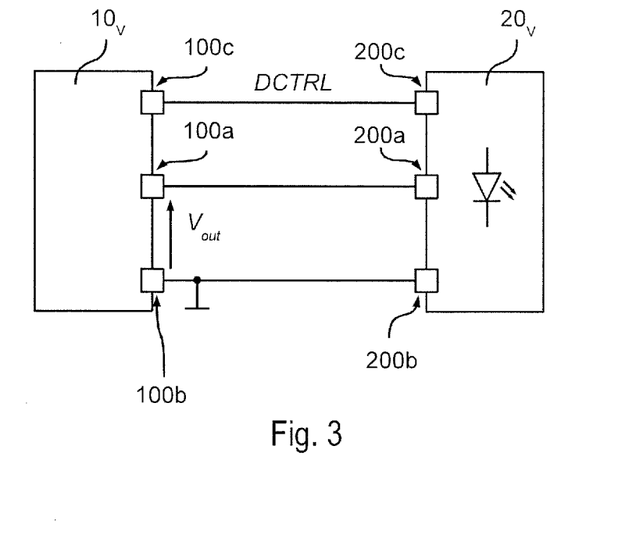

Instead, FIG. 3 shows a lighting system, in which the power-supply circuit is a voltage generator 10v, and likewise the lighting module 20 is a module 20v configured for being supplied by means of a voltage.

Consequently, in FIG. 3, the power-supply circuit 10v supplies at output via a positive terminal 100a and a negative terminal 100b, which again represents a voltage reference, a regulated voltage $V_{out}$.

Figure 4:
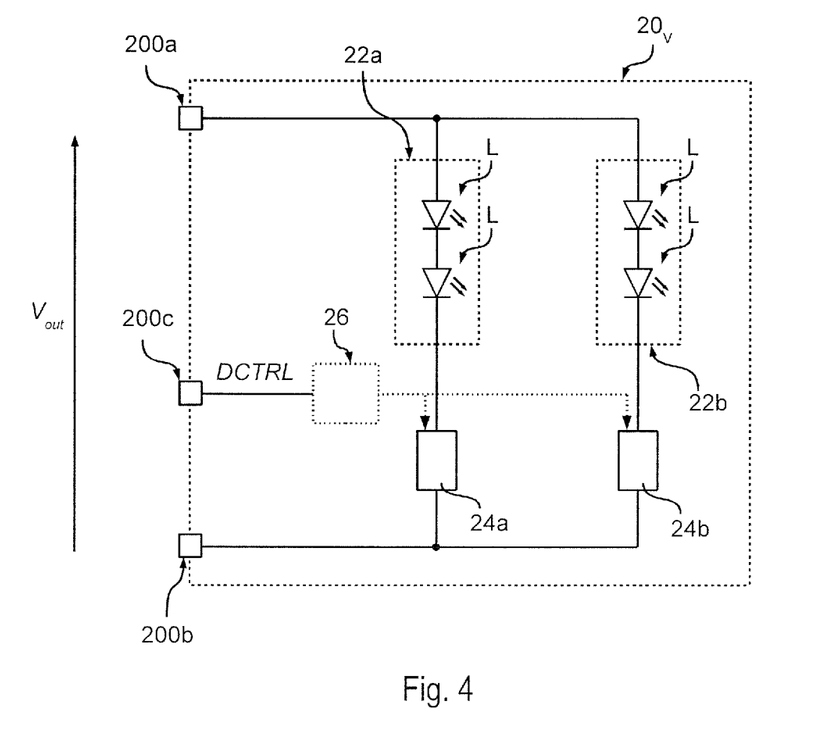

FIG. 4 shows an example of a lighting module 20v configured for being supplied by means of a regulated voltage $V_{out}$. In particular, the lighting module 20v comprises a positive input terminal 200a and a negative input terminal 200b for connection to the terminals 100a and 100b of the electronic converter 10v. Also in this case, the lighting module 20v can be connected directly or through a cable to the electronic converter 10v.

In the example considered, the lighting module 20v is a LED module comprising a LED string 22 connected between the terminals 200a and 200b. In general, the LEDs L (or other solid-state light sources) can also be divided into various branches connected in parallel. For example, as shown in FIG. 4, the module 20v may comprise a first LED string 22a, including a first set of LEDs L connected in series, and a second LED string 22b, including a second set of LEDs L connected in series.

Since the lighting module 20v is supplied with a voltage, the lighting module 20v also comprises means 24 for regulating the current flowing through each LED string 22. For instance, in FIG. 4, the first LED string 22a and a first current regulator 24a are connected (for example, directly) in series between the terminals 200a and 200b, and the second LED string 22b and a second current regulator 24b are connected (for example, directly) in series between the terminals 200a and 200b. Consequently, in the example considered, the strings 22a and 22b are supplied with a common voltage ($V_{out}$). In the simplest case, the current regulator 24 may be a resistor or a linear current regulator. The current regulator 24 may be implemented also with current mirrors or with a switching current regulator (or switched-mode current source), typically comprising an inductor and an electronic switch.

Also in this case, the brightness of the sources L (i.e., the intensity of the light emitted by the sources L) can be controlled by regulating the mean current flowing through the sources L to implement the so-called dimming function.

For this purpose, the power-supply circuit 10 can activate and de-activate the current $V_{out}$ with ON and OFF times $T_{ON}$ and $T_{OFF}$, respectively, for example with a pulse-width modulation (PWM), in which the switching period $T_{SW}=T_{ON}+T_{OFF}$ is constant.

Likewise, the lighting module 20v may comprise one or more further terminals 200c for receiving one or more dimming-control signals DCTRL. In general, also in this case, the signal received can be used for directly driving the means 24. Alternatively, the lighting module 20v may comprise a control circuit 26, which receives the dimming-control signal DCTRL and generates the signals for the means 24 as a function of the dimming-control signal DCTRL. For example, the control circuit 26 can switch the current regulators 24 on or off with a PWM signal or set the reference current of a linear or switching current regulator.

Consequently, in the solutions described previously, the lighting module 20 may comprise a plurality of light sources L, for example, a plurality of strings 22, which can be controlled individually. Consequently, by providing light sources L, for example strings 22, with different spectral characteristics, in particular with reference to the colour of the light emitted, the lighting system may be able to emit light with given spectral characteristics.

For instance, it is possible to provide a first set of LEDs (for example, a first string 22a) with a first correlated colour temperature and a second set of LEDs (for example, a second string 22b) with a second correlated colour temperature. In this way, by appropriately driving the means 24 (i.e., by regulating the current flowing through each set of LEDs), the correlated colour temperature of the light emitted as a whole by the lighting module 20 may be chosen between the first and second correlated colour temperatures.

Figure 5:
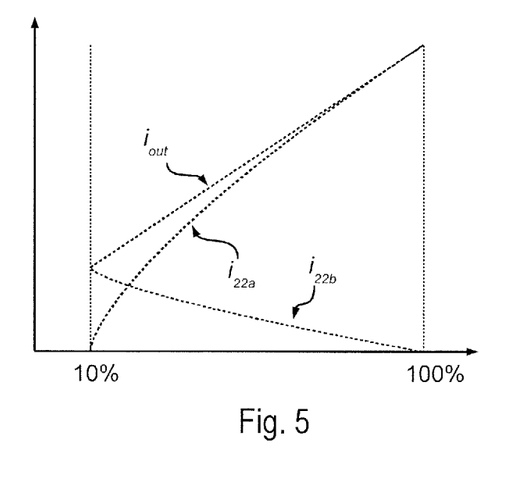

For instance, FIG. 5 shows a possible relation of the current $i_{out}$ supplied by the power-supply circuit 10c shown in FIG. 1 versus the level of brightness required, such as, for example, a linear relation.

Consequently, by distributing the current $i_{out}$ between the first string 22a and the second string 22b (for example, using the means 24 described previously) it is possible to set the ratio between the current $i_{22a}$ flowing through the first string 22a and the current $i_{22b}$ flowing through the second string 22b, and consequently the proportion between the light emitted with the first correlated colour temperature and the light emitted with the second correlated colour temperature.

For example, in FIG. 5 it is assumed that the first string 22a comprises LEDs having a colour temperature higher than that of the LEDs of the string 22b. Consequently, in this case, the correlated colour temperature of the overall light can be reduced (rendering the colour warmer) by increasing the ratio between the current $i_{22b}$ and the current $i_{22a}$ at low levels of brightness. For example, in FIG. 5, the current $i_{22b}$ is increased from $i_{22b}=0$ for a brightness of 100% to $i_{22b}=i_{out}$ for a brightness of 10% in FIG. 5. Instead, the current $i_{22a}$ is reduced from $i_{22a}=i_{out}$ for a brightness of 100% to $i_{22a}=0$ for a brightness of 10%, where $i_{22a}+i_{22b}=i_{out}$. Consequently, the LED string 22b with lower correlated colour temperature is gradually connected in parallel to the LED string 22a with higher correlated colour temperature when the current required is reduced.

However, to implement this control, a rather sophisticated control circuit 26 is required. For example, integrated circuits or microcontrollers are typically used to control the combination of light with different colours, for instance in so-called RGB systems. Consequently, this solution is costly.

In general, a similar solution can be used also for lighting modules 20v configured for being supplied with a voltage, for example by appropriately driving the current regulators 24a and 24b shown in FIG. 4.

Alternatively, the negative terminal 200b can be split into two, where the first LED string 22a is connected between the positive terminal 200a and the first negative terminal, and the second LED string 22b is connected between the positive terminal 200a and the second negative terminal, thus providing a lighting module with two channels, in which the LED strings 22a and 22b can be supplied individually by means of the power-supply circuit, by connecting the respective negative line to ground, for example, according to a PWM signal.

However, also in this case, a complex control circuit is required for driving the LED strings on the basis of a dimming signal in such a way as to implement the dimming operation with shifting of the correlated colour temperature.

OBJECT AND SUMMARY

The object of the present disclosure is to provide solutions for implementation of a shifting of the correlated colour temperature of the above sort that is less complex as compared to known solutions.

According to various embodiments, the above object is achieved thanks to a lighting system having the characteristics recalled in the ensuing claims. The claims also regard a corresponding lighting module.

The claims form an integral part of the technical teaching provided herein in relation to the invention.

As mentioned previously, various embodiments of the present disclosure regard a lighting system. The lighting system comprises a power-supply circuit and a plurality of strings of solid-state light sources, such as LEDs.

In various embodiments, the power-supply circuit comprises two output terminals and is configured to supply a regulated voltage through the two output terminals, wherein the regulated voltage is periodically activated for a first duration and de-activated for a second duration as a function of a dimming signal.

In various embodiments, a first string of solid-state light sources and a first current regulator are connected in series between the two output terminals of the power-supply circuit, wherein the first current regulator is configured for regulating the current flowing through the first string. Moreover, a second string of solid-state light sources and a second current regulator are connected in series between the two output terminals of the power-supply circuit, wherein the second current regulator is configured for regulating the current flowing through the second string. For example, the above strings may form part of a lighting module that is connected to the two output terminals of the power-supply circuit. In various embodiments, the light sources of the first string have a first correlated colour temperature, and the light sources of the second string have a second correlated colour temperature, wherein the second correlated colour temperature is lower than the first correlated colour temperature.

In various embodiments, the lighting system further comprises means configured to activate the current flowing through the first string when a given time has elapsed since a rising edge of the regulated voltage and to de-activate the current flowing through the first string simultaneously with a falling edge of the regulated voltage; i.e., the first string is activated with a delay with respect to the rising edge of the regulated voltage and de-activated with the falling edge of the regulated voltage.

For example, in various embodiments, the above means comprise a delay circuit configured to detect a rising edge of the regulated voltage and generate an enable signal when the given time has elapsed since the rising edge. In this case, the first current regulator can be configured to activate the current flowing through the first string when the enable signal indicates that the given time has elapsed, and de-activate the current simultaneously with a falling edge of the regulated voltage. For this purpose, the first current regulator may comprise an electronic switch connected in series to the first string of solid-state light sources, wherein a control terminal of the electronic switch is driven by means of the enable signal.

For example, the delay circuit may comprise a resistor and a capacitor connected in series between the two output terminals of the power-supply circuit. In this case, the enable signal may correspond to the voltage on the capacitor, or the voltage on the capacitor may be used for driving an electronic switch that supplies the enable signal, thus enabling, for example, an inversion of logic level.

In various embodiments, the delay circuit may also comprise other components, for example, a further resistor connected in parallel to the capacitor.

In various embodiments, the delay circuit may be implemented also with a processing circuit, such as a microprocessor programmed via software code. This processing circuit can hence also implement more complex functions. For example, in various embodiments, the processing circuit can detect the first duration and/or the second duration by analysing the voltage supplied by the power-supply circuit (in order to detect the dimming level), and vary the given time as a function of the first duration and/or second duration.

In various embodiments, the second current regulator is, instead, configured to activate the current flowing through the second string simultaneously with a rising edge of the regulated voltage and to de-activate the current flowing through the second string simultaneously with a falling edge of the regulated voltage; i.e., the second string is activated and de-activated with the rising edge and the falling edge, respectively, of the regulated voltage.

Consequently, at high brightness levels, the delay introduced for switching on the first string is substantially negligible, and the correlated colour temperature of the light as a whole emitted by the strings corresponds to the sum (possibly weighted) of the correlated colour temperatures of the light sources. Instead, at low brightness levels, the delay reduces more the brightness of the first string (with higher correlated colour temperature), and the colour temperature of the light as a whole emitted by the strings is warmer.

BRIEF DESCRIPTION OF THE ANNEXED REPRESENTATIONS

Embodiments will now be described, purely by way of non-limiting example, with reference to the annexed representations, in which:

FIGS. 1 to 5 have already been described previously;

DETAILED DESCRIPTION OF EMBODIMENTS

In the ensuing description, various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of this description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be adequately combined in one or more embodiments.

The references used herein are provided only for convenience and hence do not define the sphere of protection or the scope of the embodiments.

In the following FIGS. 6 to 18, the parts, elements, or components that have already been described with reference to FIGS. 1 to 5 are designated by the same references used previously in the above figures; the description of these elements described previously will not be repeated hereinafter in order not to overburden the present detailed description.

As mentioned previously, the present disclosure provides solutions for obtaining solid-state lighting systems that are able to vary the correlated colour temperature as a function of a dimming signal.

Figure 6:
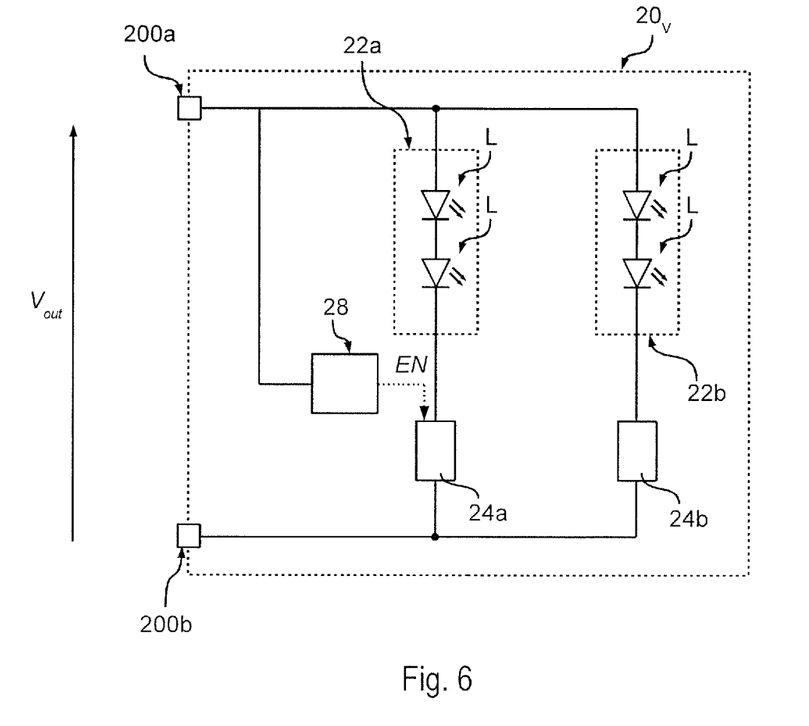
FIG. 6 shows an embodiment of a lighting module according to the present disclosure.

FIG. 6 shows a first embodiment of a lighting module 20 that can be used with a power-supply circuit 10v configured to supply a regulated voltage $V_{out}$ (see also FIG. 3).

In particular, in the embodiment considered, the lighting module 20 comprises a positive input terminal 200a and a negative input terminal 200b for connection to the terminals 100a and 100b of the electronic converter 10v. Also in this case, the lighting module 20v can be connected directly or through a cable to the electronic converter 10v. Consequently, the terminal 200a is connected to the terminal 100a, and the terminal 200b is connected to the terminal 100b, and the lighting module 20 hence receives the voltage $V_{out}$.

In the example considered, the lighting module 20 comprises a first LED string 22a, comprising a first set of LEDs L connected in series, and a second LED string 22b, comprising a second set of LEDs L connected in series. In particular, the LED strings 22 are connected between the terminals 200a and 200b. In general, instead of LEDs L also other solid-state light sources may be used. In particular, the first string 22a comprises light sources with a first correlated colour temperature, and the second string 22b comprises light sources with a second correlated colour temperature, wherein the second correlated colour temperature is lower than the first correlated colour temperature.

Since the lighting module 20 is supplied with a voltage, the first LED string 22a and a first current regulator 24a are connected (for example, directly) in series between the terminals 200a and 200b, and the second LED string 22b and a second current regulator 24b are connected (for example, directly) in series between the terminals 200a and 200b. Consequently, in the example considered, the strings 22a and 22b are supplied via a common voltage ($V_{out}$).

Also in this case, the brightness of the sources L of a string 22 can be controlled by regulating the mean current flowing through the string 22.

Figure 7:
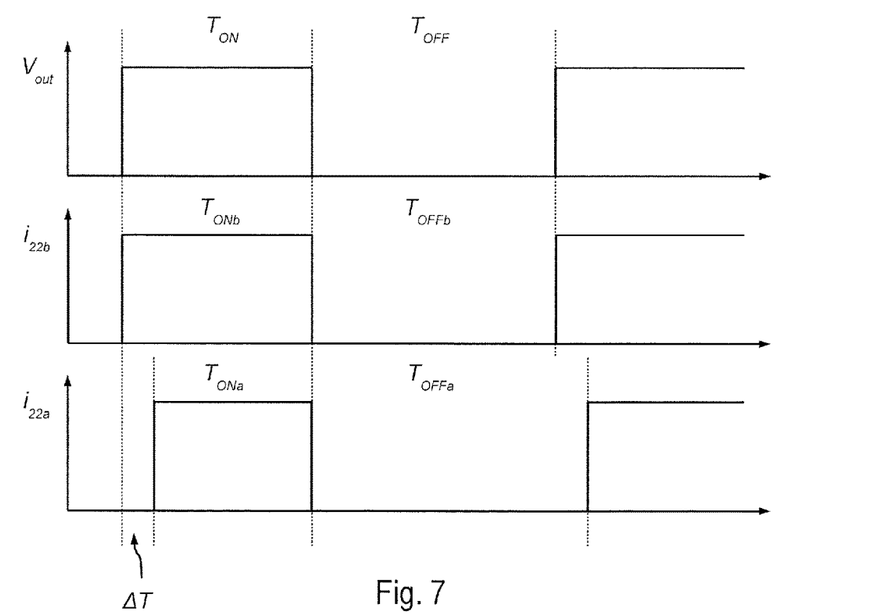
FIGS. 7 and 9 illustrate operation of the lighting module of FIG. 6.

In particular, as shown in FIG. 7, the power-supply circuit 10v can be configured to generate an output voltage $V_{out}$ of a substantially constant amplitude that periodically is switched on and off with respective ON and OFF times $T_{ON}$ and $T_{OFF}$, as a function of a dimming signal, for example by means of a pulse-width modulation (PWM), in which the switching period $T_{SW}=T_{ON}+T_{OFF}$ is constant.

Consequently, in the embodiment considered, the lighting module 20 is supplied for a duration $T_{ON}$ and is switched off for a duration $T_{OFF}$, thus enabling regulation of the brightness of the light emitted by the lighting module 20. For example, typically the switching frequency ($1/T_{SW}$) is between 100 Hz and 5 kHz.

In particular, in various embodiments, the string 22b with the lower correlated colour temperature is switched on simultaneously with the rising edge of the voltage $V_{out}$ and switched off simultaneously with the falling edge of the voltage $V_{out}$. Consequently, the current $i_{22b}$ flowing through the string 22b corresponds to a signal with square waveform, in which the current $i_{22b}$ has a substantially constant amplitude (set by means of the regulator 22b) that is periodically switched on and off with respective ON and OFF times $T_{ONb}$ and $T_{OFFb}$, where $T_{ONb}=T_{ON}$ and $T_{OFFb}=T_{OFF}$.

Instead, in the embodiment considered, the string 22a with the higher correlated colour temperature is switched on with a delay $\Delta T$ with respect to the rising edge of the voltage $V_{out}$ and switched off simultaneously with the falling edge of the voltage $V_{out}$. Consequently, the current $i_{22a}$ flowing through the string 22a corresponds to a signal with square waveform, in which the current $i_{22a}$ has a substantially constant amplitude (set by means of the regulator 22a) that is periodically switched on and off with respective ON and OFF times $T_{ONa}$ and $T_{OFFa}$, in which $T_{ONa}=T_{ON}-\Delta T$ and $T_{OFFa}=T_{OFF}+\Delta T$. For example, in various embodiments, the duration $\Delta T$ is chosen between 2% and 15% of the duration $T_{SW}$, preferably between 5% and 10% of the duration $T_{SW}$.

For instance, in the embodiment shown in FIG. 6, the lighting module 20 comprises for this purpose a delay circuit 28 that generates an activation signal EN for the current regulator 24a, when the time $\Delta T$ has elapsed since activation (i.e., the rising edge) of the voltage $V_{out}$. Consequently, in the embodiment considered, the current regulator 24a comprises an input for receiving the signal EN from the circuit 28 and is configured to activate the current $i_{22a}$ only when the signal EN supplied by the circuit 28 indicates the fact that the time $\Delta T$ has elapsed. Instead, in the embodiment considered, de-activation of the current regulator 24a occurs simultaneously with the falling edge of the voltage $V_{out}$, since the supply for the current regulator 24a is absent. Instead, the current regulator 24b may be a traditional current regulator without any additional input. For instance, as explained previously, such a current regulator may be a resistor or a linear current regulator. The current regulator may be implemented also with current mirrors or with a switching current regulator (or switched-mode current source), typically comprising an inductor and an electronic switch.

Figure 8:
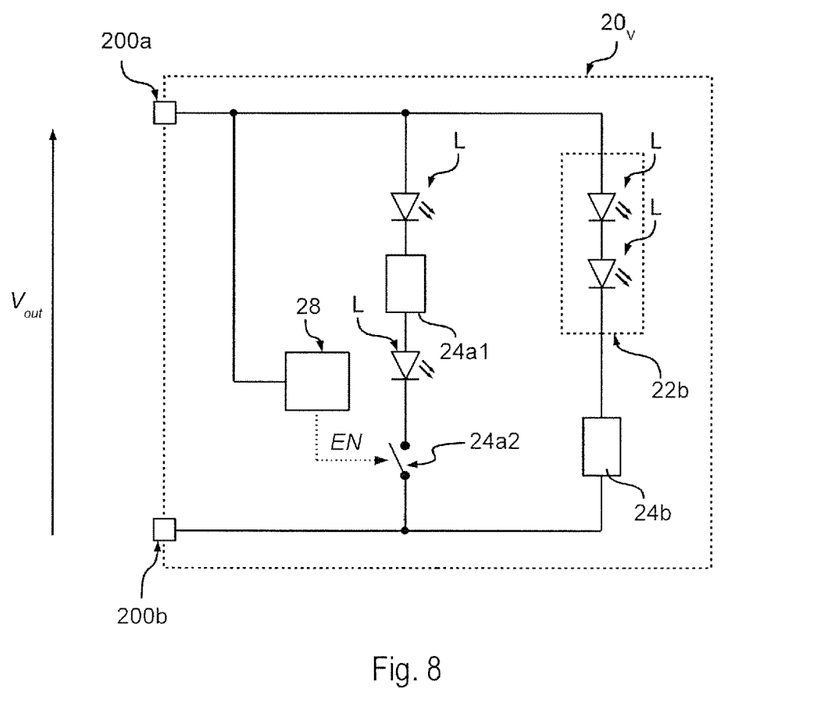
FIG. 8 shows an embodiment of the lighting module of FIG. 6.

FIG. 8 shows an embodiment of the current regulator 24a.

In particular, in the embodiment considered, a traditional current regulator 22a1 (without additional input) and an additional electronic switch 22a2, such as a bipolar transistor or a field-effect transistor, for example, an n-channel MOSFET, are connected in series to the light sources L between the terminals 200a and 200b. In this case, the delay circuit 28 can drive switching of the switch 22a2 with the signal EN; i.e., the switch 22a2 is closed by means of the circuit 28 when the time $\Delta T$ has elapsed. Consequently, also in this case, the current regulator 24a (implemented with switches 24a1 and 24a2) associated to the string 22a with higher correlated colour temperature is switched on with a delay $\Delta T$.

Figure 9:
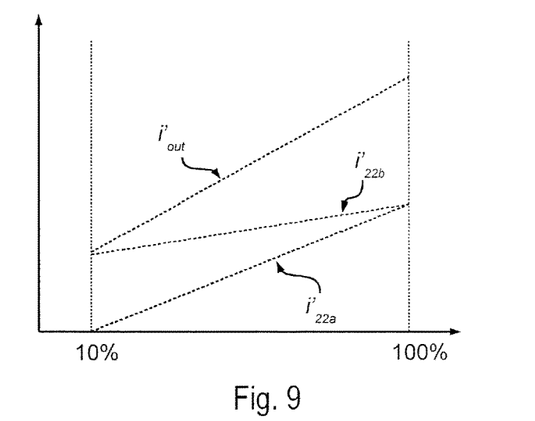

Consequently, as shown in FIG. 9, when the duty cycle of the voltage $V_{out}$ is high (high brightness), for example 100%, the switching-on delay $\Delta T$ introduced is substantially negligible with respect to the switching period $T_{SW}$ of the voltage $V_{out}$; i.e., the ON time $T_{ONa}$ of the string 22a with higher correlated colour temperature substantially corresponds to the ON time $T_{ONb}$ of the string 22b with lower correlated colour temperature. Consequently, at high brightness levels, the correlated colour temperature of the light emitted by the lighting module 20 (which, as a whole, is traversed by a mean current $i_{L'out}$ that corresponds to the sum of the mean currents $i_{L'22a}$ and $i_{L'22b}$ that flow through the strings 22a and 22b, i.e., $i_{L'out}=i_{L'22a}+i_{L'22b}$), i.e., the combination of the light emitted by the light sources of both of the strings 22a and 22b, substantially corresponds to the average correlated colour temperature of both strings 22a and 22b. In general, this average may even be weighted, for example using different currents $i_{22a}$ and $i_{22b}$ for the strings 22a and 22b, for instance, by setting different currents for the current regulators 24a and 24b.

Instead, when the duty cycle of the voltage $V_{out}$ is reduced, the effect of the delay $\Delta T$ introduced becomes important. In fact, in this case, the ON time $T_{ONa}$ (and hence the mean current $i_{L'22a}$) of the string 22a with higher correlated colour temperature decreases in proportion to the ON time $T_{ONb}$ (and hence to the mean current $i_{L'22b}$) of the string 22b with lower correlated colour temperature. Consequently, in proportion, the light emitted by the string 22a is less than the light emitted by the string 22b with lower correlated colour temperature, thus producing a shift of the colour of the light emitted towards the lower correlated colour temperature.

For example, in various embodiments, the correlated colour temperature of the string 22a is chosen between 3500K and 4500K, for example 4000K, and the correlated colour temperature of the string 22b is chosen between 1500K and 2500K, for example 2000K, which makes it possible to have a correlated colour temperature of the module 20 ranging, for example, from approximately 2900K (at 100% of flow) to 2000K (below 5%). In general, by choosing the delay $\Delta T$ and/or the amplitudes of the currents $i_{22a}$ and $i_{22b}$, it is also possible to use other combinations of CCTs in such a way as to obtain the desired correlated colour temperatures with high and low brightness levels. For example, in various embodiments, the string 22a may comprise traditional white LEDs (for example, with a colour temperature of 3000K), and the string 22b may comprise monochromatic amber LEDs to create the dimmed candle-light effect.

In the embodiments described previously, the delay circuit 28 hence activates and de-activates the current regulator 24a of the string 22a with higher CCT directly intervening on the current regulator 24a or on an electronic switch 24a2 connected in series to the string 22a. In the former case, the delay circuit 28 can hence also affect the behaviour of the current regulator 24a, for example, to implement a dimming operation, thus improving the curve of colour shift as a function of the duty cycle of the voltage $V_{out}$. Instead, in the latter case, no modification of the current regulator 22a1 is required. However, also in this case, dimming may be obtained using the resistance of the electronic switch as an additional current regulator.

In general, the delay circuit 28 can implement a fixed or variable delay. For instance, a fixed delay may be implemented with a delay circuit 28 comprising a resistor and a capacitor connected in series between the lines 200a and 200b, in which the voltage on the capacitor corresponds to the activation signal supplied to the regulator 24a. Between the capacitor and the regulator 24a there could also be provided a comparator that stabilizes the signal. In various embodiments, this delay may also be programmable.

Moreover, in various embodiments, the circuit 28 can also detect the dimming level, for example by analysing the times $T_{ON}$ and/or $T_{OFF}$ of the voltage $V_{out}$, for instance to detect the duty cycle of a PWM signal. Consequently, in various embodiments, the delay circuit 28 can determine the value of the time $\Delta T$ as a function of the dimming level required, for example, the duty cycle of the voltage $V_{out}$. Consequently, the delay circuit 28 can be implemented also with more complex circuits, for instance, a microprocessor programmed via software code, which can take into consideration also further parameters, for example, regarding operation of the lighting module 20 and/or the characteristics of the power-supply signal $V_{out}$.

Consequently, in the embodiments considered, the lighting module 20 can be supplied with a pulsed regulated voltage $V_{out}$, and no additional external signals for driving operation are required.

However, the delay circuit 28 is not necessarily incorporated in the lighting module.

Figure 10:
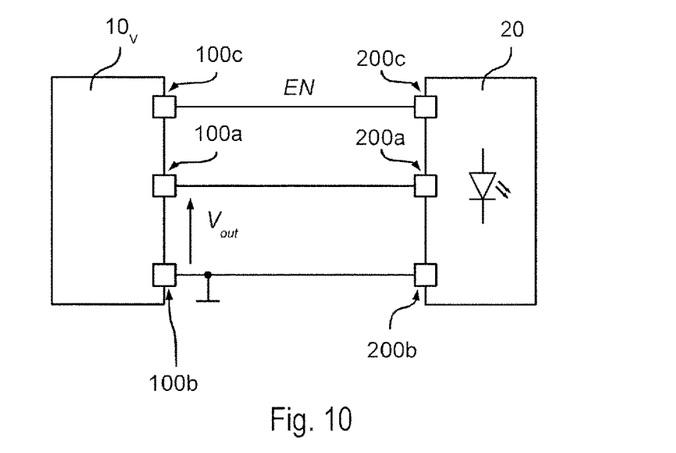
FIGS. 10, 11, 12, and 13 show lighting systems according to the present disclosure.

For example, FIG. 10 shows an embodiment in which the delay circuit 28 is incorporated in the power-supply circuit 10. Consequently, in this case, the power-supply circuit 10 may comprise a terminal 100c for supplying the signal EN, and the lighting module may comprise a terminal 200c for receiving the signal EN that is supplied inside the regulator 24a.

Figure 11:
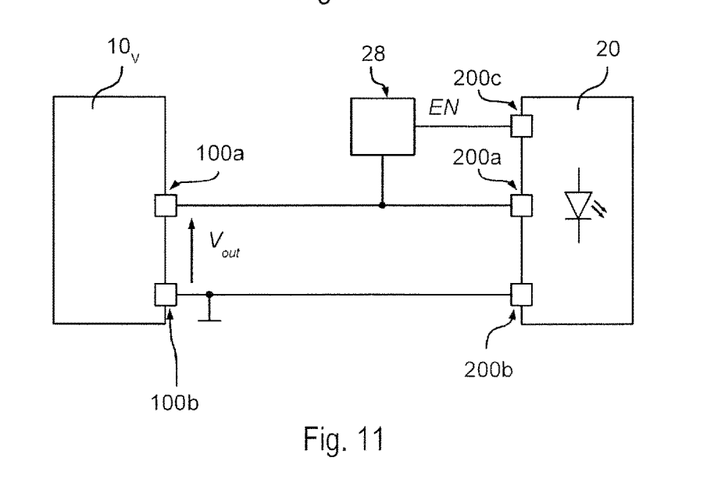

Instead, FIG. 11 (as likewise FIG. 13) shows an embodiment, in which the delay circuit 28 is external to the power-supply circuit 10 and the lighting module 20. However, also in this case, the delay circuit generates the signal EN by detecting the rising edge of the voltage $V_{out}$. For this purpose, the delay circuit 28 is connected, for example, to the electrical line that connects the terminals 100a and 200a. Consequently, in this embodiment, the power-supply circuit 10 may be a traditional power-supply circuit that supplies only the voltage $V_{out}$.

For example, such a delay circuit 28 can be integrated in an additional device, which is connected to the terminals 200a, 200b, and 200c of the lighting module 20. For instance, such a device can be integrated in the connector of the lighting module 20.

Figure 12:
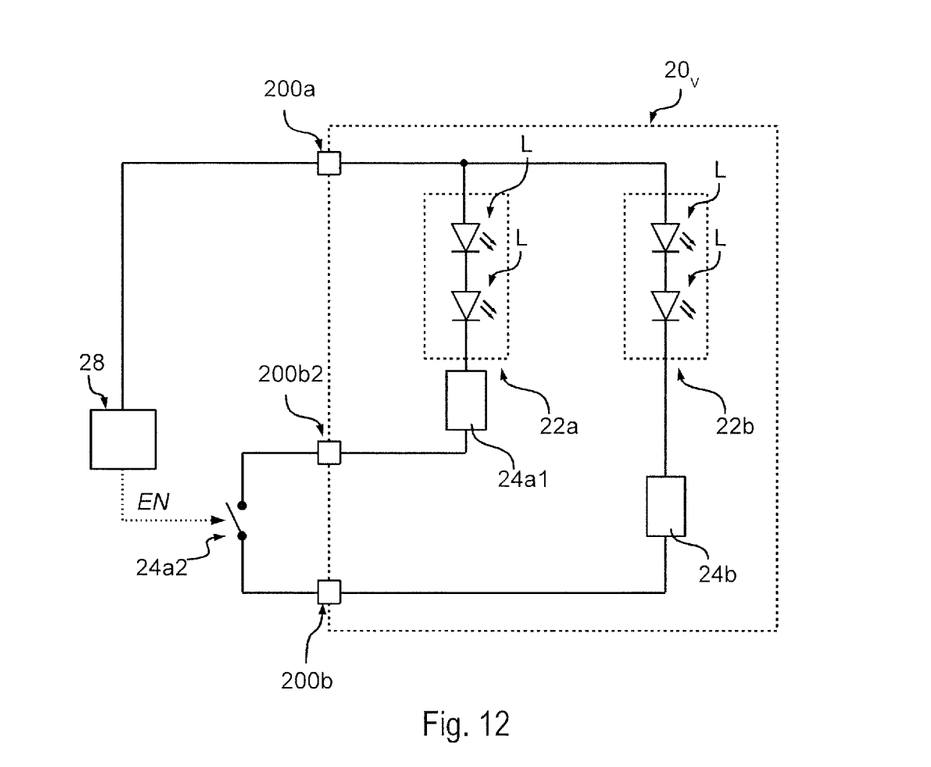

Finally, FIG. 12 shows an embodiment, in which also the switch 24a2 is external to the lighting module 20, for example, integrated in the power-supply circuit 10 or in an additional device connected to the lighting module 20. In particular, in this case, the lighting module 20 substantially corresponds to a lighting module 20 having two channels as described previously. In particular, the string 22b and the regulator 24b are connected (for example, directly) between the terminals 200a and 200b. Instead, the string 22a and the regulator 24a1 are connected (for example, directly) between the terminals 200a and an additional terminal 200b2. Finally, the electronic switch 24a2 is connected externally between the terminals 200b and 200b2.

Consequently, by closing the switch 22a2 with a delay with respect to the rising edge of the voltage applied to the terminals 200a and 200b, switching-on of the string 22a can be delayed respect to switching-on of the string 22b.

In the embodiments described previously, it has been assumed that the number of the light sources La that make up the string 22a corresponds to the number of the light sources Lb that make up the string 22b.

Figure 13:
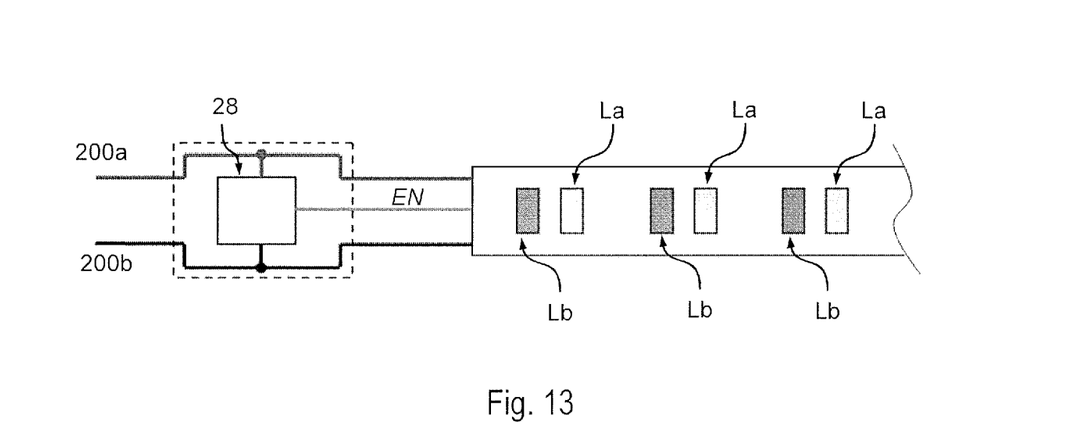

This is also shown in FIG. 13, in which a light source La of the string 22a is set physically in the vicinity of a respective light source Lb of the string 22b in such a way as to combine the light emitted by the pair of sources La/Lb.

However, in general, even a plurality of light sources Lb can be set close to each light source La or, vice versa, a plurality of light sources La can be set close to each light source Lb. Consequently, the solution proposed can be used with various types of arrangements, for example LED strips (see FIG. 13), such as flexible LED strips, matrix arrangements of LEDs, etc.

The various light sources La and Lb may form part of a single respective string 22a and 22b, or the light sources La and Lb may be distributed on a plurality of respective strings 22a and 22b connected in parallel between the terminals 100a and 100b of the electronic converter 10, in which each string 22a is connected in series to a current regulator 24a. For example, the maximum number of LEDs that can be connected in series will depend upon the voltage of the LEDs and the voltage $V_{out}$. Finally, the strings 22a and the strings 22b may form part of one and the same lighting module 20 or may be distributed on a number of lighting modules.

Also in this case, the delay circuit 28 may be directly incorporated in each lighting module 20 connected to the power-supply circuit 10 or the delay circuit 28 may be common to a plurality of lighting modules 20, incorporating the delay circuit 28 in the power-supply circuit 10 or in an additional device (i.e., external to the power-supply circuit 10 and the lighting module 20).

Consequently, the solutions described present various advantages, which are listed below.

It is possible to implement a regulation of the brightness with shifting of the correlated colour temperature also with lighting modules supplied by means of a pulsed regulated voltage using a single supply channel, since mixing of the light for implementing shifting of the correlated colour temperature can be implemented directly within the lighting module 20.

In the case of the present solution, no complex external control circuit that manages mixing of the colour is required. In fact, from a standpoint of control and power supply, the lighting module 20 has an electrical connection that corresponds to a traditional white-colour lighting module, which can be supplied with a single modulated power-supply signal. Consequently, also the cost of installation is reduced because no additional cables are required.

The solution proposed is in any case modular and can be applied to a wide range of types of modules.

Some examples of implementation will now be described.

Figure 14:
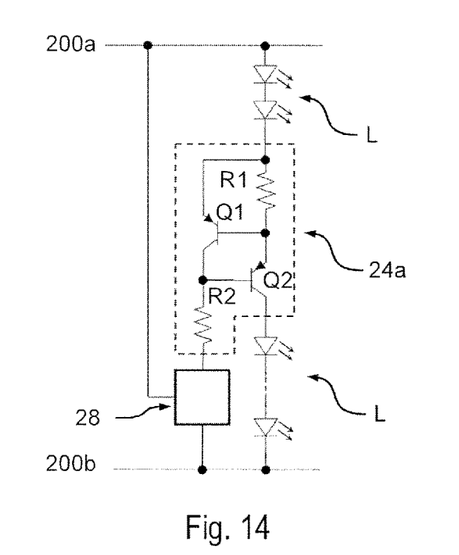
FIGS. 14, 15, 16, 17, and 18 show various embodiments of the lighting module of FIG. 6

For example, FIG. 14 shows an embodiment of the regulator 24a with a current limiter with two bipolar transistors.

As is well known, such a current limiter comprises a resistor R1 and a bipolar transistor Q2 that are connected in series to the LED string.

In particular, in such a current limiter, the voltage on the resistor R1 is supplied on the basis of a second bipolar transistor Q1, which in turn opens the first transistor Q2 when a threshold voltage is reached. Hence, by setting the value of the resistor R1 it is possible to set the maximum current that can flow through the transistor Q2.

To enable operation of such a current limiter, a biasing resistor R2 is required, which is typically connected between the base of the transistor R2 and the negative terminal 200b.

Figure 16:
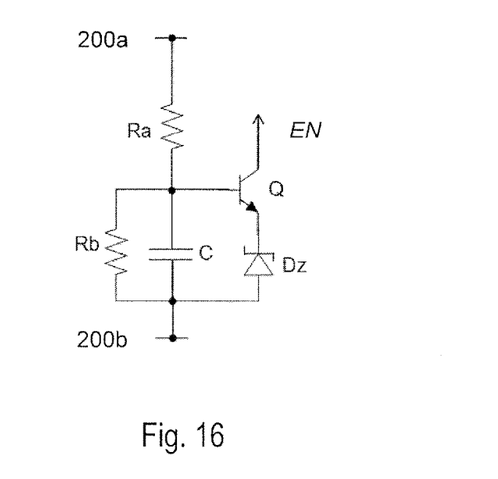

Instead, in the embodiment considered, the signal EN supplied by the delay circuit 28 is used for connecting the resistor R2 selectively to the line 200b. For example, as shown in FIG. 16, it is possible to use for this purpose an electronic switch Q, such as a bipolar transistor (or FET) connected between the output that supplies the signal EN and the line 200b.

For example, in the embodiment considered, switching of the above switch Q is driven by means of an RC filter comprising a resistor Ra and a capacitor C that are connected in series between the line 200a and the line 200b, where the voltage on the capacitor C drives the control terminal, i.e., switching, of the switch Q.

For example, once the voltage on the capacitor exceeds the voltage of the bipolar transistor Q (typically 0.7 V), the transistor Q is closed and the current limiter is activated. The switching threshold can also be set, for example, by means of a Zener diode Dz connected between the transistor Q and the terminal 200b.

In various embodiments, a resistor Rb can be connected in parallel to the capacitor C, in such a way as to discharge the capacitor C when the voltage $V_{out}$ is de-activated (i.e., during the time $T_{OFF}$).

Figure 15:
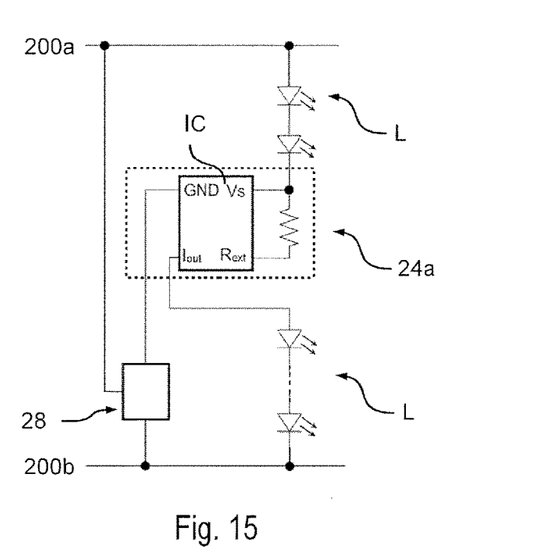

FIG. 15 shows a similar solution, in which the regulator 24a is implemented with an integrated circuit IC. Typically, such an integrated circuit IC comprises two terminals Vs and GND for receiving the power supply, a terminal Rext for receiving a signal representing the current flowing through the integrated circuit IC, for example through a resistor connected between the terminal Vs and the terminal Rext, and a terminal Iout that supplies the current.

Consequently, in this case, the signal EN can be used for enabling selectively power supply of the integrated circuit IC. For example, in FIG. 15 connection of the terminal GND of the integrated circuit IC to the negative terminal 200b is interrupted.

Figure 17:
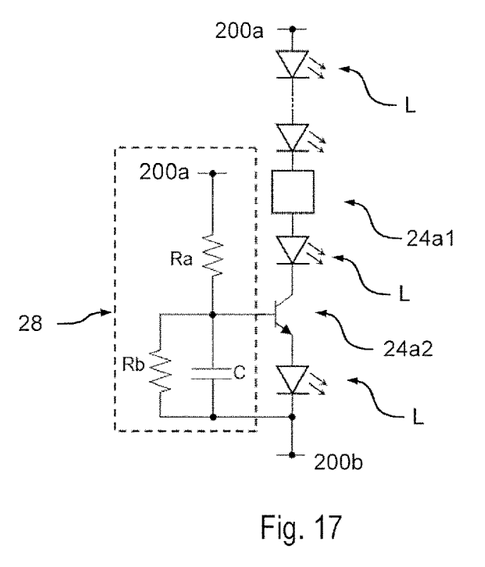

Instead, FIG. 17 shows an embodiment in which the additional electronic switch 24a2, such as a bipolar transistor or FET, is used.

For instance, in the embodiment, switching of the above electronic switch is driven as described with reference to FIG. 16 by means of an RC filter comprising a resistor Ra and a capacitor C connected in series between the terminals 200a and 200b, where the voltage on the capacitor C drives the control terminal of the switch 24a2. Also in this case, a resistor Rb connected in parallel to the capacitor C may be provided.

FIG. 17 also shows that the switch 24a2 is not necessarily directly connected to the negative terminal 200b, but one or more sources L may be connected between the switch 24a2 and the negative terminal 200b, thus increasing (like for the Zener diode Dz) the threshold when the switch 24a2 switches.

The circuit shown in FIG. 17, in which the voltage on the capacitor directly drives the control terminal of the transistor 24a2, presents the advantage that the bipolar transistor or FET is activated gradually when the voltage on the capacitor C increases, thus implementing an additional current limiter that gradually activates the string 22a.

Figure 18:
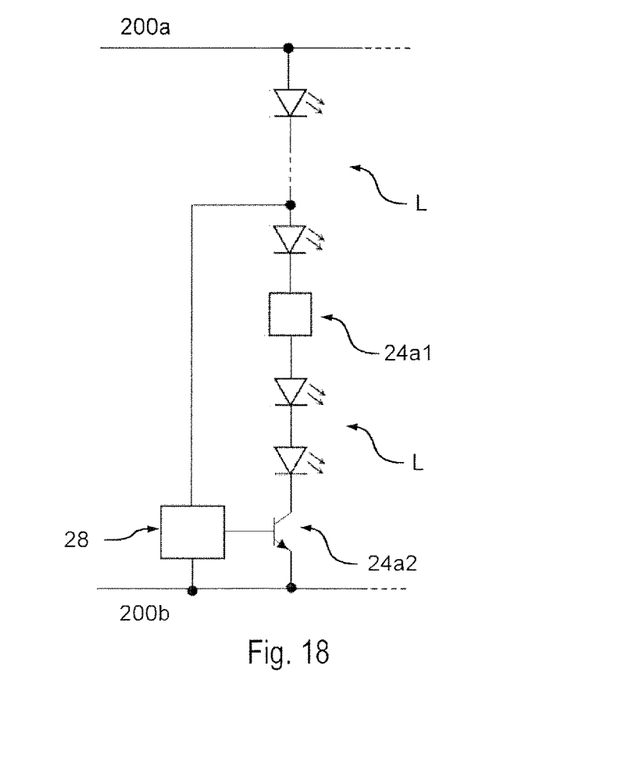

Moreover, as shown in FIG. 18, the delay circuit 28 is not necessarily directly connected to the terminal 200a, but one or more sources L can be connected between the delay circuit (for example, between the resistor Ra) 24a2 and the positive terminal 200a, thus reducing the amplitude of the voltage that is supplied to the delay circuit 28, for example the amplitude of the voltage that charges the RC filter, thus enabling a reduction of the electrical losses.

Of course, without prejudice to the principle of the invention, the details of construction and the embodiments may vary, even significantly, with respect to what has been described and illustrated herein purely by way of non-limiting example, without thereby departing from the scope of the present invention, as defined by the ensuing claims.

LIST OF REFERENCE SIGNS

Electronic converter 10c, 10v
Output terminal 100a, 100b
Control terminal 100c
Lighting module 20c, 20v
Input terminal 200a, 200b
Control terminal 200c
LED string 22a, 22b
Means for controlling the current flow 24
Current regulator 24a, 24b, 24a1
Electronic switch 240, 242, 244, 24a2
Control circuit 26
Delay circuit 28
Capacitor C
Zener diode Dz
Integrated circuit IC
LED L
Transistor Q, Q1, Q2
Resistor R1, R2, Ra, Rb
Dimming-control signal DCTRL
Activation signal EN
Output current $i_{out}$
Current flowing through the LED string $i_{22a}$, $i_{22b}$
ON time $T_{ON}$, $T_{ONa}$, $T_{ONb}$
OFF time $T_{OFF}$, $T_{OFFa}$, $T_{OFFb}$
Delay $\Delta T$
Output voltage $V_{out}$

The invention claimed is:

1. A lighting system comprising:
a power supply circuit comprising two output terminals, wherein the power supply circuit is configured to provide a regulated voltage via the two output terminals, wherein the regulated voltage is activated periodically for a first duration and deactivated for a second duration as a function of a dimming signal;
a first string of solid state light sources and a first current regulator connected in series between the two output terminals, wherein the first current regulator is configured to regulate a current flowing through the first string;
a second string of solid state light sources and a second current regulator connected in series between the two output terminals, wherein the second current regulator is configured to regulate a current flowing through the second string;
wherein the lighting system is configured to activate the current flowing through the first string when a given time has elapsed since a rising edge of the regulated voltage and deactivate the current flowing through the first string simultaneously with a falling edge of the regulated voltage; and
a delay circuit configured to detect the rising edge of the regulated voltage and generate an enable signal when the given time has lapsed since the rising edge of the regulated voltage, wherein the first current regulator is configured to activate the current flowing through the first string when the enable signal indicates that the given time has lapsed since the rising edge of the regulated voltage and deactivate the current flowing through the first string simultaneously with the falling edge of the regulated voltage.

2. The lighting system according to claim 1, wherein the second current regulator is configured to activate the current flowing through the second string simultaneously with the rising edge of the regulated voltage and deactivate the current flowing through the second string simultaneously with the falling edge of the regulated voltage.

3. The lighting system according to claim 1, wherein the delay circuit comprises a resistor and a capacitor connected in series between the two output terminals, wherein:
the enable signal corresponds to the voltage at the capacitor; or
the voltage at the capacitor is used to drive an electronic switch that provides the enable signal.

4. The lighting system according to claim 3, wherein the delay circuit comprises a further resistor connected in parallel with the capacitor.

5. The lighting system according to claim 1, wherein the delay circuit comprises a processing circuit configured to:
detect the first duration and/or the second duration, and
vary the given time as a function of the first duration and/or the second duration.

6. The lighting system according to claim 1, wherein the first current regulator comprises an electronic switch connected in series with the first string of solid state light sources, wherein a control terminal of the electronic switch is driven by the enable signal.

7. The lighting system according to claim 1, wherein the first string of solid state lights sources have a first correlated color temperature and the second string of solid state lights sources have a second correlated color temperature, wherein the second correlated color temperature is smaller than the first correlated color temperature.

8. The lighting system according to claim 1, wherein:
the first string, the first current regulator, the second string, the second current regulator, and the delay circuit are incorporated in a lighting module; or
the first string, the first current regulator, the second string, and the second current regulator are incorporated in a lighting module, and the delay circuit are incorporated in an additional device.

9. A lighting module comprising:
two input terminals configured to be connected to two-output terminals of a power supply circuit, wherein the power supply circuit is configured to provide a regulated voltage via the two output terminals,
wherein the regulated voltage is activated periodically for a first duration and deactivated for a second duration as a function of a dimming signal;
a first string of solid state light sources and a first current regulator connected in series between the two input terminals, wherein the first current regulator is configured to regulate a current flowing through the first string;
a second string of solid state light sources and a second current regulator connected in series between the two input terminals, wherein the second current regulator is configured to regulate a current flowing through the second string;
wherein the lighting module is configured to activate the current flowing through the first string when a given time has elapsed since a rising edge of the regulated voltage and deactivate the current flowing through the first string simultaneously with a falling edge of the regulated voltage; and
a delay circuit configured to detect the rising edge of the regulated voltage and generate an enable signal when the given time has lapsed since the rising edge of the regulated voltage, wherein the first current regulator is configured to activate the current flowing through the first string when the enable signal indicates that the given time has lapsed since the rising edge of the regulated voltage and deactivate the current flowing through the first string simultaneously with the falling edge of the regulated voltage.

* * * * *